United States Patent [19]

Satou et al.

[11] Patent Number: 5,073,452
[45] Date of Patent: Dec. 17, 1991

[54] FILM FOR PRINT LAMINATION

[75] Inventors: Junya Satou, Shiga; Masatsugi Murakami, Moriyama; Kikuji Sasaki, Otsu, all of Japan

[73] Assignee: Toray Industries, Inc., Tokyo, Japan

[21] Appl. No.: 520,749

[22] Filed: May 9, 1990

[30] Foreign Application Priority Data

May 9, 1989 [JP] Japan .................................. 1-116609

[51] Int. Cl.$^5$ ........................ B32B 7/12; B32B 27/08
[52] U.S. Cl. .................................. 428/349; 428/355; 428/516; 428/141
[58] Field of Search ................ 428/349, 355, 516, 141

[56] References Cited

U.S. PATENT DOCUMENTS

| | | | |
|---|---|---|---|
| 4,058,649 | 11/1977 | Steiner | 428/518 |
| 4,333,968 | 6/1982 | Nahmias | 428/355 X |
| 4,367,112 | 1/1983 | Park | 428/349 X |
| 4,666,772 | 5/1987 | Schinkel et al. | 428/349 X |
| 4,810,581 | 3/1989 | Akazawa et al. | 428/353 X |

Primary Examiner—George F. Lesmes
Assistant Examiner—D. R. Zirker
Attorney, Agent, or Firm—Birch, Stewart, Kolasch & Birch

[57] ABSTRACT

A film for print lamination is described which comprises a biaxially drawn polypropylene film having a heat-adhesive layer provided on one side thereof, the surface of said heat-adhesive layer having a wet tension not smaller than 34 dyne/cm, said heat-adhesive layer being comprised of a composition comprising:

(a) 100 parts by weight of a first component consisting of an ethylene methyl methacrylate copolymer having a melt flow rate of from 5 to 500; and
(b) from 5 to 50 parts by weight of a second component selected from the group consisting of polyethylene and an ethylene-methyl methacrylate copolymer and having a melt flow rate of from 0.05 to 3.0.

This film for print lamination is used to laminate over a printed surface of a printed matter by application of heat and pressure to obtain a laminated product having a good gloss.

23 Claims, No Drawings

FILM FOR PRINT LAMINATION

BACKGROUND OF THE INVENTION

1. Field of the Invention

The present invention relates to a film for use in heat/pressure bond print lamination, having superior gloss and provided with a heat-adhesive layer which enables lamination to a printed paper, for example, simply by the application of heat and pressure without requiring any adhesive.

2. Description of Related Art

It is a known technique to cover a printed paper such as a printed art paper with a film for the purpose of protecting the print, imparting resistance to water and oil and providing gloss. This technique is referred to as "print lamination" in the field of technology concerned.

Hitherto, the print lamination is carried out by a method called dry lamination in which, in a coating section of a laminator, an adhesive dissolved in an organic solvent is applied to a plastic film which is used as a substrate, and the organic solvent is evaporated in a dryer oven, the surface of the substrate carrying adhesive thereon being then bonded to the printed paper under the application of heat and pressure.

The dry lamination method suffers from a disadvantage in that the thickness of the adhesive layer is small because the adhesive is dissolved in an organic solvent, so that undulation of the printed paper is directly reflected to impair the gloss. In addition, this method cannot provide sufficiently high adhesive strength.

In recent years, films for print lamination are available, which themselves have bondability so as to be bonded by heat and pressure without the aid of any adhesive.

For example, Japanese Unexamined Patent Publication (Tokkai-sho) No. 56-42652 discloses a film for print lamination which comprises a biaxially drawn polypropylene film having a heat-adhesive layer provided on one side thereof, said heat-adhesive layer comprising an ethylene vinyl acetate copolymer.

Japanese Examined Patent Publication (Tokko-sho) No. 63-12792 discloses a film for print lamination comprising a biaxially drawn polypropylene film layer and a heat-adhesive layer which comprising polyethylene or an ethylene copolymer such as a copolymer of ethylene and propylene, butene-1, vinyl acetate, ethyl acrylate or acrylic acid, and the surface of which exhibits a wet tension not smaller than 36 dyne/cm.

Japanese Unexamined Utility Model Publication (Jikkai-sho) No. 61-50437 discloses a film for print lamination which comprises a biaxially drawn polypropylene film having a heat-adhesive layer provided on one side thereof, said heat-adhesive layer comprising a copolymer of ethylene and acrylic acid, acrylic ester, methacrylic acid or methacrylic ester.

Japanese Unexamined Utility Model Publication (Jikkai-sho) No. 62-126931 discloses a film for print lamination which comprises a first layer comprising a biaxially drawn polypropylene film, a second layer comprising a polyolefin film, and a third layer, as a heat-adhesive layer, which comprises an ethylene propylene block copolymer, a petroleum resin and an ethylene acrylic acid copolymer.

A heat/pressure bond type print lamination film is inferior in slipperiness and antiblocking characteristic. In consequence, troubles are experienced such as wrinkling during production of the film and deterioration of the flatness of the film surface or a breakage of film due to adjacent film surfaces sticking to one another when being unwound from a roll.

In order to obviate these problems, it has been proposed to add a large quantity of polymer having poor compatibility, organic lubricant and inorganic particles so as to impart a high slipperiness and antiblocking characteristic. The use of such additives causes other problems such as degradation in the heat-adhesiveness, inferior quality of the print laminated product such as the occurrence of many voids and fisheyes in the bonded layer. In addition, this type of film exhibits inferior flexing resistance so that defects such as local separation or floating of the film from the printed paper are experienced when the laminate product is bent after the heat bonding.

SUMMARY OF THE INVENTION

A primary object of the present invention is to provide a film for print lamination only by the use of heat and pressure without an adhesive agent, which has a good heat-adhesiveness and which has a good slipperiness and antiblocking characteristics to permit the use of existing laminating machines such as a dry laminator with a high production efficiency, and from which a print-laminated product having a good gloss can be obtained.

In accordance with the present invention, there is provided a film for print lamination which comprises a biaxially drawn polypropylene film having a heat-adhesive layer provided on one side thereof, the surface of said heat-adhesive layer having a wet tension not smaller than 34 dyne/cm, said heat-adhesive layer being composed of a composition comprising: (a) 100 parts by weight of a first component consisting of an ethylene-methyl methacrylate copolymer having a melt flow rate of from 5 to 500; and (b) from 5 to 50 parts by weight of a second component selected from the group consisting of polyethylene and an ethylene-methyl methacrylate copolymer and having a melt flow rate of from 0.05 to 3.0.

DESCRIPTION OF THE PREFERRED EMBODIMENTS

The polypropylene used in the present invention preferably has an isotactic index of from 90 to 99% and an intrinsic viscosity $[\eta]$ of from 1.0 to 4.0 dl/g, more preferably from 1.2 to 2.3 dl/g, when measured in tetralin. More specifically, polypropylene having an isotactic index of from 96 to 98%, polypropylene having a high crystallization peak temperature not lower than 110° C., or polypropylene having both of these features is preferred. Polypropylene used in the present invention can be copolymerized with a monomer other than propylene or may be mixed with a polymer other than polypropylene, provided that the amount of copolymerization or mixing is small enough to avoid any impediment of the advantage of the present invention. For instance, a random copolymerization with ethylene, butene, hexene or the like in a small quantity of not more than 3 mole % is permissible, but the use of a propylene homopolymer is specifically preferred.

The surface roughness Ra of the biaxially drawn polypropylene film of the present invention is preferably not more than 0.06 $\mu$m, more preferably not more than 0.04 $\mu$m. Too large surface roughness Ra causes the gloss and transparency of the print-laminated paper to be impaired due to the scattering of light.

Although not exclusive, the biaxially drawn polypropylene film has usually a thickness of from 10 to 30 μm. The biaxially drawn polypropylene film may be of any single-layer film and multi-layer film. The biaxially drawn polypropylene film can contain known additives such as nucleating agents, antioxidants, heat stabilizers, slip agents, antistatic agents and antiblocking agents.

The first component used in the present invention is an ethylene methyl methacrylate copolymer having a melt flow rate of from 5 to 500, preferably 15 to 150. The ethylene-methyl methacrylate copolymer used as the first component preferably has a methyl methacrylate content of from 10 to 50% by weight, more preferably from 20 to 40% by weight.

The second component used in the present invention has a melt flow rate of from 0.05 to 3.0, preferably from 0.1 to 1.5. The second component is either polyethylene or an ethylene-methyl methacrylate copolymer. Preferably the second component is polyethylene. The polyethylene used in the present invention is preferably a medium- or low-density polyethylene, though this is not essential insofar as the requirement concerning the melt flow rate is satisfied. The ethylene-methyl methacrylate copolymer used as the second component preferably has a methyl methacrylate content of from 0.1 to 15% by weight.

The heat-adhesive layer in the present invention is composed of a composition comprising the above-mentioned first component and second component. The amount of the second component in the composition is in the range of from 5 to 50 parts by weight based on 100 parts by weight of the first component. A desirable surface roughness of the heat-adhesive layer can be obtained by mixing the two components in the above-mentioned mixing ratio.

The content of a methyl methacrylate in the composition is preferably at least 5% and smaller than 50% by weight, more preferably at least 10% and smaller than 40% by weight, and most preferably at least 15% and smaller than 40% by weight. When the methyl methacrylate content in the composition is too small, the adhesive strength obtained through the heat/pressure lamination of the film on the printed matter is insufficient so as to allow for an easy separation of the film from the printed matter, and the melting temperature of the composition is raised to require a higher laminating pressure and temperature, resulting in an inferior production efficiency, and since the fluidity is small, any coarseness on a printed matter is directly reflected upon the biaxially drawn polypropylene film, so as to impair the gloss. On the other hand, a too large content of a methyl methacrylate in the composition makes it difficult to handle the composition as an ordinary resin and makes it impossible to extrude the composition, and the composition exhibits a excessively large fluidity so that it is squeezed off the gap between the film and a printed matter during laminating under heat and pressure, thus increasing the tendency for the pressing roll and other part to be contaminated.

The copolymerization of ethylene and methyl methacrylate to produce an ethylene-methyl methacrylate copolymer used as the first component or the second component may be conducted in various suitable methods such as random copolymerization, graft copolymerization, high-pressure ethylene copolymerization and so forth. It is to be noted that the graft copolymerization is rather inferior in heat-resistance and economy.

In order to prevent blocking, it is necessary that a large difference exists between the melt flow rates of the first component and the second component. The melt flow rate of the first component is preferably at least 5 times, more preferably at least 7 times as large as the melt flow rate of the second component. When the melt flow rate of the second component exceeds 3.0, the tendency for coarsening of the surface of the film, which largely affects the slipperiness and antiblocking characteristics, becomes smaller. Coarsening of the surface is prevented also when the melt flow rate of the first component is smaller than 5. The melt flow rate of the first component exceeding 500 makes it difficult to handle the composition as a resin and, hence, to extrude the composition in a normal way. In addition, the film inevitably has many fisheyes.

The composition can comprise additional additives such as known slipping agents, antiblocking agents, antistatic agents and so forth. For instance, an organic amide can be used as a slipping agent in an amount of from 0.1 to 2.0% by weight based on the total weight of the first component and second component, and silica having a particle size of from 0.5 to 10 μm can be used as an antiblocking agent in an amount of from 0.1 to 2.0% by weight based on the weight of the total weight of the first component and second component.

Although not exclusively, the thickness of the heat-adhesive layer in the present invention falls within the range of from 2 to 25 μm, preferably from 5 to 20 μm, and more preferably from 7 to 17 μm from the view point of gloss and adhesive strength.

The surface roughness Ra of the heat-adhesive layer in the present invention is preferably not less than 0.2 μm and more preferably not less than 0.35 μm. The surface roughness Rt of the heat-adhesive layer is preferably not less than 1.5 μm and more preferably not less than 2.0 μm. The surface roughness Ra below 0.2 μm impairs an antiblocking characteristic which is one of the objects to be achieved by the present invention, and impairs slipperiness. On the other hand, when the print lamination is conducted by laminating the film to a printed matter by application of heat and pressure, the film tends to be laminated in a wrinkled state because of inferior slipperiness between the printed matter and the film, whereby the quality of the finished laminated product is impaired seriously. The slipperiness is also impaired when the surface roughness Rt is below 1.5 μm.

The surface of the heat-adhesive layer has a wet tension of not less than 34 dyne/cm, preferably not less than 36 dyne/cm. The wet tension below 34 dyne/cm undesirably reduces an adhesive strength and impairs the anti-bending characteristic such as to cause partial floating of the film above the printed matter when the laminated product is bent in a subsequent step of process.

The surface of the heat-adhesive layer having a wet tension of not less than 34 dyne/cm is obtained by treating the surface with a corona discharge in air or in an atmosphere composed mainly of carbon dioxide gas.

The heat-adhesive layer preferably has a melting point Tm of from 50° to 100° C., more preferably from 55° to 80° C.

Although not exclusively, various method can be used for laminating the heat-adhesive layer on the biaxially drawn polypropylene film: such as a method in which polypropylene and the above-mentioned composition are co-extruded using a T-die method and then the extrudate is biaxially drawn, a method in which the above-mentioned composition is laminated on a uniaxially drawn polypropylene film and then the laminated film is drawn, and a method called "extrusion laminating" in which the above-mentioned composition is melt-extruded and deposited onto the biaxially drawn polypropylene film using an extrusion-laminating machine. Of these methods, the most preferable method is one in which the above-mentioned composition is laminated on a uniaxially drawn polypropylene film and then the laminated film is drawn. In so-called "extrusion laminating", protrusions of the heat-adhesive layer surface are apt to be depressed during laminating.

An example of the process for preparing the film for print lamination of the present invention will now be described, although the process that can be adopted in the present invention is not limited to the process described below.

Polypropylene is supplied to an extruder and melt-extruded from the extruder head. The extrudate is cast on a cooling drum which is maintained at a temperature between 25° and 60° C. so as to be cooled and solidified. Subsequently, after a preheating in a hot air oven maintained between 120° and 145° C., the cast film is drawn in the longitudinal direction at a draw ratio of 4 to 7. Then, the composition for the heat-adhesive layer is melt-extruded from another extruder onto the surface of the uniaxially drawn polypropylene film in a manner that the surface of the heat-adhesive layer is brought into contact with the cooling drum which is held at a temperature between 25° and 60° C. The laminate film which is cooled and solidified is then introduced into a tenter held at a temperature between 140° and 170° C. and is drawn in the lateral direction at a draw ratio of 7 to 12, and the drawn film is thermally set at a temperature between 150° and 165° C. while being relaxed in an amount of several percents. The film is then cooled on a cooling roll, and the side ends of the film are removed by cutting, and a corona discharge treatment is effected on the surface of the heat-adhesive layer of the film in the air, and the film is taken up and coiled.

The definitions of terms used in the present invention and the methods adopted for measuring the characteristic values and evaluating the effects in the present invention will now be described.

(1) Intrinsic Viscosity [η]

The intrinsic viscosity [η] is measured in tetralin in accordance with the method ASTM D 1601 and is expressed in a unit of deciliter per gram.

(2) Isotactic Index

From 8 to 10 grams of a sample is made into a powder or flake state and is put in a cylindrical filter paper which has been dried at a temperature of 110°±5° C. for 2 hours. The cylindrical filter paper containing the sample is left as it is in a room maintained at a constant temperature and humidity for not less than 2 hours, and then it is precisely weighed using a measuring cup and a pair of tweezers, and the weight expressed in a unit of gram is designated as $P_0$. Then it is deposited in the upper part of an extractor containing about 80 milliliter of n-heptane. After assembling the extractor and a condenser into a complete unit, n-heptane is heated using an oil bath and the sample is treated in a boiling n-heptane for 12 hours. The condition of heating is controlled in order that not less than 130 drops per a minute from the condenser may be observed. After extraction, the cylindrical filter paper containing the residue is removed from the extractor, placed in a vacuum drier, and is dried at a temperature of 80° C. and in a vacuum degree of the vacuum is below 100 mmHg for 5 hours in which the left as it is for 2 hours in a room maintained at a constant temperature and humidity, and then is precisely weighed, and the weight expressed in a unit of gram is designated as P. The isotactic index of the sample is calculated by the following formula:

Isotactic index(%) = $(P/P_0) \times 100$ (3) Surface Roughness Ra

The surface roughness Ra is a neutral line mean roughness measured at a cut-off value of 0.25 mm in accordance with JIS B 0601.

(4) Surface Roughness Rt

The surface roughness Rt is a distance between the highest crest and the deepest valley in the roughness curve measured in accordance with JIS B 0601.

(5) Slipperiness

Two sample films which have been held in a room maintained at a temperature of 20° C. and at a humidity of 65% for 24 hours are stacked so that the heat-adhesive layer side of one sample film may be in contact with the heat-adhesive layer side of the other sample film, and a load of 200 gram is placed on the stack. Then the static friction coefficient $\mu_s$ and the dynamic friction coefficient $\mu_d$ are measured by moving the lower one of the stacked films at a speed of 150 meter per minute. A smaller value of the static friction coefficients indicates a better slipperiness.

(6) Antiblocking Characteristic

Two sample films having a width of 3 centimeter and a length of 10 centimeter are superposed over an area having a width of 3 centimeter and a length of 4 centimeter so that the heat-adhesive layer side of one sample film may be in contact with the heat-adhesive layer side of the other sample film, and are left in an atmosphere maintained at a temperature of 40° C. and at a humidity of 85% for 24 hours under application of a load of 6 kilogram. The antiblocking characteristic is expressed in terms of the force required for the shearing separation of the sample films measured by a tensile tester. A smaller value of the force indicates a better antiblocking characteristic.

(7) Melt Flow Rate

The melt flow rate is measured in accordance with JIS K 6730-1981.

(8) Wet Tension

The wet tension is measured using a mixture liquid composed of formamide and ethylene glycol monoethyl ether in accordance with JIS K 6768.

(9) Print Laminate Characteristics a) Heat-adhesiveness

A sample film is placed on the printed surface of a printed paper for use as a book cover such that the heat-adhesive layer of the film may be in contact with the paper. Then the film and the paper are adhered to each other by pressing by means of a heated mirror-surface roll having a diameter of 50 mm at a line pressure of 60 kg/cm and a speed of 25 m/min. The heat-adhesiveness is evaluated in terms of the surface temperature of the mirror-surface roll at which an adhesive strength, a force necessary to separate the film from the paper at an angle of 180 degrees and at a speed of 200 mm/min at a temperature of 25° C. using a tensilon, has become 150 g/cm.

When the above-mentioned adhesive strength has become 150 g/cm at a temperature lower than 100° C., the heat-adhesiveness of the sample film is evaluated in terms of "good". When the adhesive strength is smaller than 150 g/cm even after the temperature has been raised to 115° C., the heat-adhesiveness of the sample film is evaluated in terms of "poor". When the adhesive strength has become 150 g/cm at a temperature between 100° C. and 115° C., the heat-adhesiveness of the sample film is evaluated in terms of "medium".

b) Gloss

A print-laminated product obtained by laminating a sample film onto a paper at a temperature which provides an adhesive strength of 150 g/cm between the film and the paper is organoleptically evaluated at its outer surface. The gloss is classified into the following three classes:

"good": The surface is shiny and and glossy. The printed matter is observed clearly.
"poor": The surface is cloudy and inferior in gloss. The printed matter cannot be clearly observed.
"medium": Intermediate between two levels shown above.

The present invention will now be described in detail with reference to the following examples.

EXAMPLE 1

One extruder is supplied with polypropylene having an intrinsic viscosity [η] of 1.0 dl/g and an isotactic index of 96%. Another extruder is supplied with a mixture composed of 100 parts by weight of an ethylene methyl methacrylate copolymer having a methyl methacrylate content of 30% by weight and a melt flow rate of 50 and 43 parts by weight of an ethylene-methyl methacrylate copolymer having a methyl methacrylate content of 10% by weight and a melt flow rate of 2 as a composition composing a heat-adhesive layer.

The polypropylene is melt-extruded from the one extruder at a temperature of 280° C. The extrudate is nip-cast on a casting drum having a mirror-finished surface maintained at 30° C. so as to be quickly cooled and solidified to become an undrawn film. The undrawn film is then introduced into a hot air oven heated to 140° C. and is drawn in the longitudinal direction at 135° C. at a draw ratio of 5 and is cooled so as to become a uniaxially drawn film.

Subsequently, the aforementioned mixture was melt-extruded from the another extruder heated to 240° C. onto the surface of the uniaxially drawn film of polypropylene. The obtained two-layer film is cooled and solidified by a cooling roll maintained at 30° C. and having a surface finished by sand blast, and is drawn in the lateral direction at a draw ratio of 10 in a tenter heated to 160° C., and was then heat-treated at 155° C. while a relaxation of 5% is allowed in the lateral direction, and was cooled on the cooling roll. And both side ends of the film are removed by cutting. And the surface of the aforementioned mixture layer of the film is treated by a corona discharge in the air. And the film is wound up.

The obtained film has a total thickness of 25 μm with the polypropylene layer of 15 μm thick and a heat-adhesive layer of 10 μm thick. And the heat-adhesive layer of the obtained film has a surface roughness Ra of 0.36 μm, a surface roughness Rt of 2.81 μm and a wet tension of 42 dyne/cm.

The slipperiness and antiblocking characteristics of the obtained film are evaluated. As for the slipperiness, the static friction coefficient $\mu_s$ of the film is 0.51 and the dynamic friction coefficient $\mu_d$ of the film is 0.45, which proved that the film has a good slipperiness. The antiblocking characteristic of the film is 960 g/12 cm$^2$, which proved that the film has a good antiblocking characteristic.

Then, the obtained film is placed on the printed surface of a printed paper for use as a book cover such that the heat-adhesive layer of the film may be in contact with the printed paper, and the film and the paper are adhered to each other by pressing by means of a heated mirror-surface roll having a diameter of 500 mm at a line pressure of 60 kg/cm and a speed of 25 m/min. Both gloss and heat-adhesiveness of the obtained print-laminated product are evaluated to be "good".

EXAMPLE 2

The procedures of Example 2 are repeated in the same manner except that the another extruder is supplied with a mixture composed of 100 parts by weight of an ethylene-methyl methacrylate copolymer having a methyl methacrylate content of 28% by weight and a melt flow rate of 60 and 11 parts by weight of an ethylene-methyl methacrylate copolymer having a methyl methacrylate content of 10% by weight and a melt flow rate of 2 as a composition comprising a heat-adhesive layer.

The obtained film has a total thickness of 30 μm with the polypropylene layer of 15 μm thick and a heat-adhesive layer of 15 μm thick. And the heat-adhesive layer of the obtained film has a surface roughness Ra of 0.59 μm, a surface roughness Rt of 4.20 μm and a wet tension of 40 dyne/cm.

The obtained film is evaluated in the same manner as Example 1. As for the slipperiness, the static friction coefficient $\mu_s$ of the film is 0.50 and the dynamic friction coefficient $\mu_d$ of the film is 0.35, which proved that the film has a good slipperiness. The antiblocking characteristic of the film was 820 g/12 cm$^2$, which proved that the film has a good antiblocking characteristic. The gloss and heat-adhesiveness of the obtained print-laminated product are evaluated to be "good".

COMPARATIVE EXAMPLE 1

The procedures of Example 1 are repeated in the same manner except that the another extruder was supplied with an ethylene-methyl methacrylate copolymer having a methyl methacrylate content of 4% by weight and a melt flow rate of 5 as a composition comprising a heat-adhesive layer.

The obtained film has a total thickness of 20 μm with a polypropylene layer of 15 μm thick and a heat-adhesive layer of 5 μm thick. And the heat-adhesive layer of the obtained film has a surface roughness Ra of 0.12 μm, a surface roughness Rt of 1.06 μm and a wet tension of 41 dyne/cm.

The obtained film is evaluated in the same manner as Example 1. As for the slipperiness, the static friction coefficient $\mu_s$ of the film is 1.36 and the dynamic friction coefficient $\mu_d$ of the film is 1.03, which proved that the film has a poor slipperiness. The antiblocking characteristic of the film is 2140 g/12 cm², which proved that the film has a poor antiblocking characteristic. The gloss of the obtained print-laminated product is evaluated to be "medium" and the heat-adhesiveness of the obtained print-laminated product is evaluated to be "poor".

EXAMPLE 3

The procedures of Example 1 are repeated in the same manner except that the another extruder was supplied with a mixture comprised of 100 parts by weight of an ethylene-methyl methacrylate copolymer having a methyl methacrylate content of 25% by weight and a melt flow rate of 7 and 25 parts by weight of a low-density polyethylene having a melt flow rate of 0.3 as a composition comprising a heat-adhesive layer.

The obtained film has a total thickness of 23 μm with a polypropylene layer of 15 μm thick and a heat-adhesive layer of 8 μm thick. And the heat-adhesive layer of the obtained film has a surface roughness Ra of 0.42 μm, a surface roughness Rt of 3.80 μm and a wet tension of 42 dyne/cm.

The obtained film was evaluated in the same manner as Example 1. As for the slipperiness, the static friction coefficient $\mu_s$ of the film is 0.23 and the dynamic friction coefficient $\mu_d$ of the film was 0.18, which proved that the film has a good slipperiness. The antiblocking characteristic of the film is 450 g/12 cm², which proved that the film has a good antiblocking characteristic. The gloss and heat-adhesiveness of the obtained print-laminated product are evaluated to be "good".

COMPARATIVE EXAMPLE 2

The procedures of Example 1 are repeated in the same manner except that the another extruder was supplied with an ethylene-methyl methacrylate copolymer having a methyl methacrylate content of 60% by weight and a melt flow rate of 250 as a composition comprising a heat-adhesive layer.

The supply of the copolymer to the other extruder could not be conducted stably and, in addition, extrusion is rendered difficult due to large neck-in.

COMPARATIVE EXAMPLE 3

The procedures of Example 2 are repeated in the same manner except that the corona discharge treatment in the air is omitted.

The obtained film has a wet tension of 33 dyne/cm.

Both the gloss and heat-adhesiveness of the obtained print-laminated product are evaluated to be "medium".

COMPARATIVE EXAMPLE 4

The procedures of Example 1 are repeated in the same manner except that the another extruder was supplied with an ethylene-vinyl acetate copolymer having a vinyl acetate content of 15% by weight and a melt flow rate of 3 as a composition comprising a heat-adhesive layer.

The heat-adhesive layer of the obtained film has a surface roughness Ra of 0.07 μm, a surface roughness Rt of 0.65 μm and a wet tension of 41 dyne/cm.

The obtained film is evaluated in the same manner as Example 1. As for the slipperiness, the static friction coefficient $\mu_s$ and the dynamic friction coefficient $\mu_d$ of the film are both not less than 5, which proved that the film has a poor slipperiness. The antiblocking characteristic of the film is 2600 g/12 cm², which proved that the film has a poor antiblocking characteristic. The heat-adhesiveness of the obtained print-laminated product is evaluated to be "good" but the gloss of the obtained print-laminated product is evaluated to be "poor".

COMPARATIVE EXAMPLE 5

The procedures of Example 1 are repeated in the same manner except that the another extruder was supplied with a mixture comprised of 100 parts by weight of an ethylene-methyl methacrylate copolymer having a methyl methacrylate content of 13% by weight and a melt flow rate of 7 and 43 parts by weight of an ethylene-propylene copolymer having an ethylene content of 20% by weight and a melt flow rate of 2.5 as a composition comprising a heat-adhesive layer.

The heat-adhesive layer of the obtained film has a surface roughness Ra of 0.15 μm, a surface roughness Rt of 1.4 μm and a wet tension of 41 dyne/cm.

The obtained film was evaluated in the same manner as Example 1. As for the slipperiness, the static friction coefficient $\mu_s$ of the film is 0.70 and the dynamic friction coefficient $\mu_d$ of the film is 0.67, that proved the film has a poor slipperiness. The antiblocking characteristic of the film was 2500 g/12 cm², that proved the film had a poor antiblocking characteristic. The gloss and heat-adhesiveness of the obtained print-laminated product are both evaluated to be "poor".

We claim:

1. A film for print lamination which comprises a biaxially drawn polypropylene film having a heat-adhesive layer provided on one side thereof, the surface of said heat-adhesive layer having a wet tension of not smaller than 34 dyne/cm, said heat-adhesive layer being comprised of a composition comprising:
   (a) 100 parts by weight of a first component consisting of an ethylene-methyl methacrylate copolymer having a melt flow rate of from 5 to 500; and
   (b) from 5 to 50 parts by weight of a second component having a melt flow-rate of from 0.05 to 3.0 selected from the group consisting of polyethylene and an ethylene-methyl methacrylate copolymer, wherein said heat-adhesive layer has a surface roughness Ra of not less than 0.2 μm and a surface roughness Rt of not less than 1.5 μm.

2. The film for print lamination according to claim 1, wherein the composition for the heat-adhesive layer has a methyl methacrylate content of at least 5% and smaller than 50% by weight.

3. The film for print lamination according to claim 1, wherein the first component is an ethylene-methyl methacrylate copolymer having a methyl methacrylate content of from 10 to 50% by weight.

4. The film for print lamination according to claim 1, wherein the second component is polyethylene selected from the group consisting of a medium-density polyethylene and a low-density polyethylene.

5. The film for print lamination according to claim 1, wherein the second component is an ethylene-methyl methacrylate copolymer having a methyl methacrylate content of from 0.1 to 15% by weight.

6. The film for print lamination according to claim 1, wherein the surface of the heat-adhesive layer has been subjected to a corona discharge treatment.

7. The film for print lamination according to claim 1, wherein the biaxially drawn polypropylene film has a thickness of from 10 to 30 μm, and the heat-adhesive layer has a thickness of from 2 to 25 μm.

8. The film for print lamination according to claim 1, wherein the surface roughness Ra of said biaxially drawn polypropylene film is not more than 0.06 μm.

9. The film for print lamination according to claim 8, wherein said surface roughness Ra of said biaxially drawn polypropylene film is not more than 0.04 μm.

10. The film for print lamination according to claim 1, wherein said ethylene-methyl methacrylate copolymer has a melt flow rate of from 15 to 150.

11. The film for print lamination according to claim 1, wherein said ethylene-methyl methacrylate copolymer used as a first component has a methyl methacrylate content of from 20 to 40% by weight.

12. The film for print lamination according to claim 1, wherein said second component has a melt flow rate of from 0.1 to 1.5.

13. The film for print lamination according to claim 2, wherein said methyl methacrylate content is at least 10% and smaller than 40% by weight.

14. The film for print lamination according to claim 13, wherein said methyl methacrylate content is at least 15% and smaller than 40% by weight.

15. The film for print lamination according to claim 1, wherein said melt flow rate of said first component is at least 5 times as large as said melt flow rate of said second component.

16. The film for print lamination according to claim 1, wherein said melt flow rate of said first component is at least 7 times as large as said melt flow rate of said second component.

17. The film for print lamination according to claim 1, further comprising additives selected from the group consisting of slipping agents, antiblocking agents, and antistatic agents.

18. The film for print lamination according to claim 7, wherein said thickness of said heat-adhesive layer falls within the range of from 5 to 20 μm.

19. The film for print lamination according to claim 18, wherein said thickness of said heat-adhesive layer falls within the range of from 7 to 17 μm.

20. The film for print lamination according to claim 1, wherein said heat-adhesive layer has a surface roughness Ra of not less than 0.35 μm and a surface roughness Rt of not smaller than 2.0 μm.

21. The film for print lamination according to claim 1, wherein said surface of said heat-adhesive layer has a wet tension of not less than 36 dyne/cm.

22. The film for print lamination according to claim 1, wherein said heat-adhesive layer has a melting point Tm of from 50° to 100° C.

23. The film for print lamination according to claim 12, wherein said heat-adhesive layer has a melting point Tm of from 55° to 80° C.

* * * * *